(12) United States Patent
Chanez et al.

(10) Patent No.: US 10,859,037 B2
(45) Date of Patent: Dec. 8, 2020

(54) LOW FAN NOISE TURBOJET

(71) Applicant: Safran Aircraft Engines, Paris (FR)

(72) Inventors: Philippe Gerard Chanez, Moissy-Cramayel (FR); Claude Sensiau, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 55 days.

(21) Appl. No.: 16/029,110

(22) Filed: Jul. 6, 2018

(65) Prior Publication Data

US 2019/0010896 A1    Jan. 10, 2019

(30) Foreign Application Priority Data

Jul. 6, 2017    (FR) ...................................... 17 56401

(51) Int. Cl.
*F02K 3/06*        (2006.01)
*F02C 7/045*       (2006.01)
(Continued)

(52) U.S. Cl.
CPC ................ *F02K 3/06* (2013.01); *F02C 3/107* (2013.01); *F02C 7/04* (2013.01); *F02C 7/36* (2013.01);
(Continued)

(58) Field of Classification Search
CPC .... F02C 3/107; F02C 7/04; F02C 7/36; F05D 2220/323; F05D 2240/14; F05D 2260/40311; F05D 2260/606
See application file for complete search history.

(56) References Cited

U.S. PATENT DOCUMENTS

| | | |
|---|---|---|
| 3,843,277 A | 10/1974 | Enrich |
| 2012/0102915 A1* | 5/2012 | Baltas ....................... F02K 1/06 60/226.3 |

(Continued)

FOREIGN PATENT DOCUMENTS

| | | |
|---|---|---|
| EP | 3 187 712 A1 | 7/2017 |
| FR | 2 217 550 A1 | 9/1974 |

OTHER PUBLICATIONS

French Preliminary Search Report dated Mar. 19, 2018 in Patent Application No. 1756401 (with English translation of categories of cited documents), 10 pages.

(Continued)

*Primary Examiner* — Justin D Seabe
*Assistant Examiner* — Andrew J Marien
(74) *Attorney, Agent, or Firm* — Oblon, McClelland, Maier & Neustadt, L.L.P.

(57)    ABSTRACT

A double flow turbojet includes a fan including a disk centered on an axis of the fan which is provided with fan blades on its periphery, the blades having a leading edge, and an air inlet sleeve extending upstream of the fan and configured to delimit a gas flow designed to enter into the fan the air inlet sleeve having a collecting surface, the turbojet having an aspect ratio $$\frac{S_2}{S_{col}}$$

included in the interval $$\left[1.0;\ 1.0 + 0.4\left(\frac{L}{D}\right)\right],$$

where L/D is the form factor of the air inlet sleeve.

12 Claims, 3 Drawing Sheets

(51) Int. Cl.
*F02C 3/107* (2006.01)
*F02C 7/36* (2006.01)
*F02C 7/04* (2006.01)

(52) U.S. Cl.
CPC .... *F05D 2220/323* (2013.01); *F05D 2240/14* (2013.01); *F05D 2260/40311* (2013.01); *F05D 2260/606* (2013.01)

(56) References Cited

U.S. PATENT DOCUMENTS

| | | | |
|---|---|---|---|
| 2013/0283821 A1* | 10/2013 | Gilson | F02K 3/06 60/805 |
| 2016/0108854 A1* | 4/2016 | Lord | F02K 3/06 415/124.1 |
| 2016/0363047 A1* | 12/2016 | Schwarz | F01D 5/14 |
| 2017/0190438 A1* | 7/2017 | Qiu | F02K 3/06 |
| 2017/0298954 A1* | 10/2017 | Qiu | F02K 3/06 |
| 2017/0342913 A1* | 11/2017 | Feulner | F02C 3/04 |

OTHER PUBLICATIONS

Peters, A. et al. "Ultrashort Nacelles for Low Fan Pressure Ratio Propulsors", Transactions of the ASME: Journal of Turbomachinery, vol. 137, XP055346282, Feb. 2015, pp. 021001-1-021001-14.
Gliebe, P.R. et al. "Ultra-High Bypass Engine Aeroacoustic Study", NASA/CR-2003-212525, XP055277347, Oct. 2003, pp. 1-103 (with cover pages).

* cited by examiner

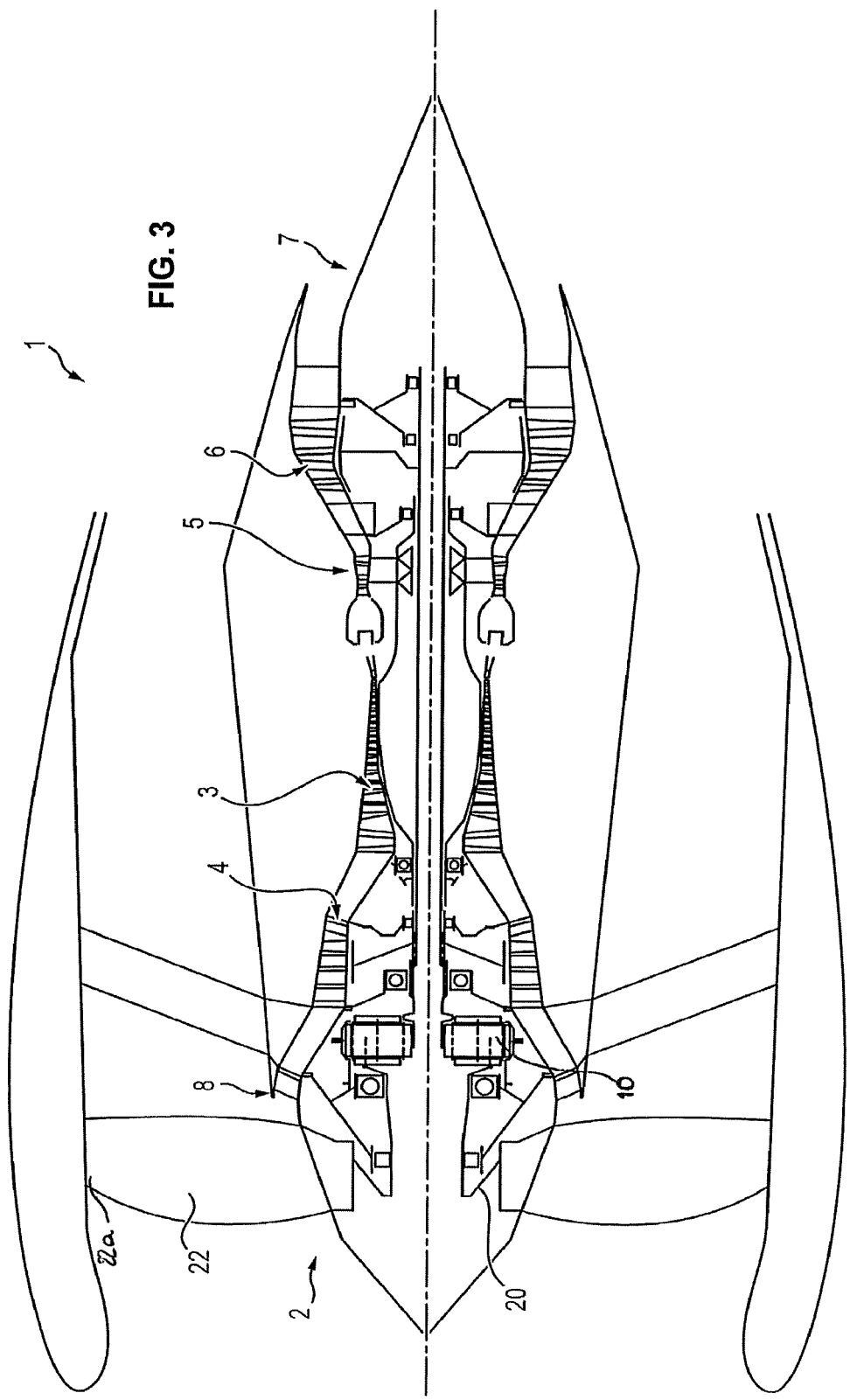

LOW FAN NOISE TURBOJET

FIELD OF THE INVENTION

The invention relates to the field of engines for aircraft, and more particularly the reduction of fan noise of turbojets having a high bypass ratio.

TECHNOLOGICAL BACKGROUND

As can be seen in the appended FIG. 3, a double flow turbojet 1 generally comprises, from upstream to downstream in the gas flow direction, a fan 2 housed in a fan casing. The fan 2 comprises a fan (or rotor) disk 20 provided with blades 22 on its periphery which, when they are placed in rotation, drive a flow of air in the turbojet 1. The mass of air aspired by the fan 2 is divided into a primary flow, which circulates in a primary flow space, and into a secondary flow, which is concentric with the primary flow and circulates in a secondary flow space.

The primary flow space passes through a primary body comprising one or more compressor stages, for example a low-pressure compressor 4 and a high-pressure compressor 3, a combustion chamber, one or more turbine stages, for example a high-pressure turbine 5 and a low-pressure turbine 6, and a gas exhaust nozzle 7.

Typically, the high-pressure turbine 5 drives the high-pressure compressor 3 in rotation by means of a first shaft, called the high-pressure shaft, while the low-pressure turbine 6 drives the low-pressure compressor 4 and the fan 2 in rotation by means of a second shaft, called the low-pressure shaft. The low-pressure shaft is generally housed inside the high-pressure shaft, said shafts being attached to structural portions (including the inlet casing, which comprises a wheel of fixed blades which supports the fan casing) of the turbojet 1 by means of bearings, typically downstream of the separation lip 8 configured to separate the primary flow and the secondary flow.

In order to improve the propulsive efficiency of the turbojet 1, to reduce its specific fuel consumption as well as the noise emitted by the fan 2, the turbojet 1 has a bypass ratio, which corresponds to the ratio between the flow rate of the secondary (cold) flow and the flow rate of the primary (hot) flow, which passes through the primary body, that is high. By high bypass is meant here a bypass ratio greater than 10, for example comprised between 12 and 18.

To this end, the fan 2 is de-coupled from the low pressure turbine 6, thus allowing independent optimization of their respective rotation speeds. For example, the de-coupling can be accomplished using a reduction gear 10, such as a star or planetary gear reduction mechanism placed between the upstream end (with respect to the gas flow direction in the turbojet 1) of the low-pressure shaft and the fan 2. The fan 2 is then driven by the low-pressure shaft by means of the reduction mechanism 10 and a supplementary shaft, called the fan shaft, which is attached between the reduction mechanism 10 and the disk 20 of the fan 2.

This decoupling thus allows a reduction of the rotation speed and the fan pressure ratio 2 and an increase in the power extracted by the low-pressure turbine 6.

The high bypass ratio of the turbojet also has the effect of considerably increasing the diameter D of the fan 2, and therefore of the nacelle which houses the fan 2, which has a negative effect both on the drag of the turbojet 1 and on its mass, and therefore on its specific fuel consumption.

SUMMARY OF THE INVENTION

One objective of the invention is to propose a turbojet having a high bypass ratio and therefore a considerable fan diameter, without however excessively penalizing its drag and its specific fuel consumption, or causing problems from the acoustic standpoint.

To this end, the invention proposes a double flow turbojet comprising:
a fan including a fan rotor comprising a disk centered on an axis of the fan comprising an nose dome, the disk being provided with fan blades on its periphery, said blades having a leading edge, and
an air inlet sleeve extending upstream of the fan and configured to delimit a gas flow designed to enter into the fan, said air inlet sleeve having a collecting surface, the turbojet being characterized in that an aspect ratio of the turbojet is comprised in the following interval:

$$\text{aspect ratio} = \frac{S_2}{S_{col}} \in \left[1.0; 1.0 + 0.4\left(\frac{L}{D}\right)\right].$$

where: $S_2$ is the cross-section of the fan, defined as a passage cross-section of the flow taken at an intersection between the leading edge of the blades of the fan and the nose dome, $S_{col}$ is the neck cross-section, defined as the minimum cross-section of the air inlet sleeve between the collecting surface and the fan D corresponds to the diameter of the fan L corresponds to a distance between an upstream point defined by an intersection of the collecting surface and the axis of the fan and a downstream point defined by the intersection between the leading edge of one of the fan blades and the nose dome $$\frac{L}{D}$$

is the form factor of the air inlet sleeve, defined as the ratio between the length of the air inlet sleeve and the diameter of the fan.

Certain preferred but non-limiting features of the turbojet described above are the following, taken alone or in combination:
the form factor is comprised between 0.1 and 0.45, preferably between 0.2 and 0.37,
the turbojet has a bypass ratio greater than or equal to 10, preferably comprised between 12 and 18,
the diameter of the fan is comprised between 203.2 centimeters and 279.4 centimeters, preferably between 203.2 centimeters and 228.6 centimeters,
an upstream portion of the air inlet sleeve is not symmetrical,
a downstream portion of the air inlet sleeve is axisymmetric, a connection between the upstream non-symmetrical portion of the air inlet sleeve and its downstream axisymmetric portion, extending at a distance comprised between one and five centimeters from a plane situated at the intersection between a radially internal wall of the of the air inlet sleeve and a most upstream point of the leading edge of the fan blades,
the turbojet also comprises: a primary flow space and a concentric secondary flow space, a turbine, housed in the primary flow space and in fluid communication with the fan, and a reduction mechanism coupling the turbine and the fan, said reduction mechanism comprising a star or planetary gear reduction mechanism having a reduction ratio comprised between 2.5 and 5.

According to a second aspect, the invention also proposes an aircraft comprising such a turbojet.

According to a third aspect, the invention proposes a method for dimensioning an air inlet sleeve of a turbojet as described above comprising the following steps:
- determining a fan diameter, and
- defining an air inlet sleeve so that an aspect ratio of the turbojet is comprises in the following interval:

$$\text{aspect ratio} = \frac{S_2}{S_{col}} \in \left[1.0; 1.0 + 0.4\left(\frac{L}{D}\right)\right].$$

where: $S_2$ is the cross-section of the fan, defined as a passage cross-section of the flow taken at an intersection between the leading edge of the blades of the fan and the nose dome, $S_{col}$ is the neck cross-section, defined as the minimum cross-section of the air inlet sleeve between the collecting surface and the fan D corresponds to the diameter of the fan L corresponds to a distance between un upstream point defined by an intersection of the collecting surface and the axis of the fan and a downstream point defined by the intersection between the leading edge of one of the fan blades and the nose dome L/D is the form factor of the air inlet sleeve, defined as the ratio between the length of the air inlet sleeve and the diameter of the fan.

Optionally, the method also comprises a step during which the form factor is defined so that said ratio is comprised between 0.1 and 0.45, preferably between 0.2 and 0.37.

BRIEF DESCRIPTION OF THE DRAWINGS

Other features, aims and advantages of the present invention will appear more clearly upon reading the detailed description that follows, and with reference to the appended drawings given by way of non-limiting examples and in which:

FIG. 3 is a schematic section view of an example of a conventional turbojet.

DETAILED DESCRIPTION OF AN EMBODIMENT

Figure 1:
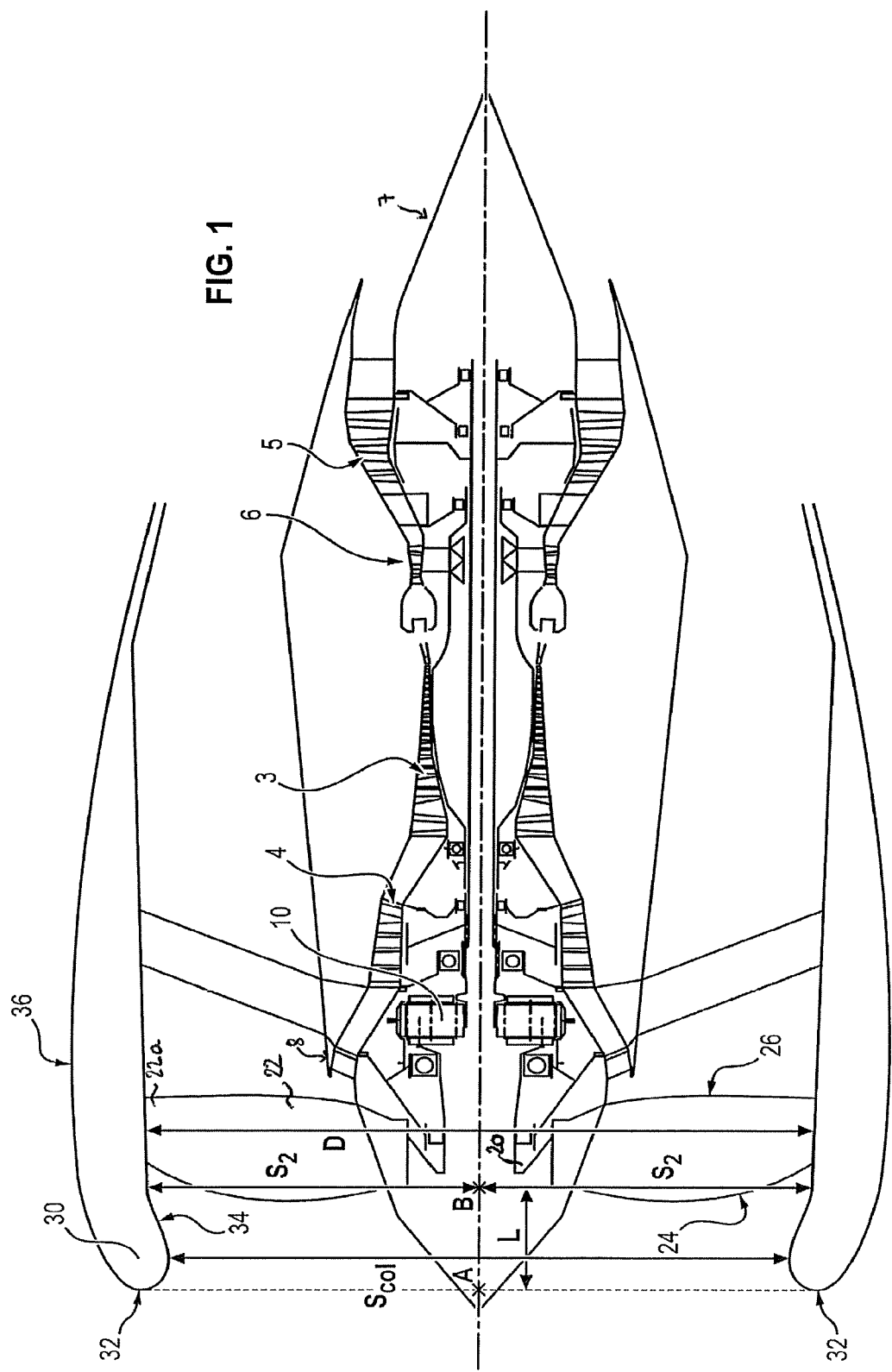
FIG. 1 is a schematic section view of an example of a turbojet conforming to the invention.
Figure 2:
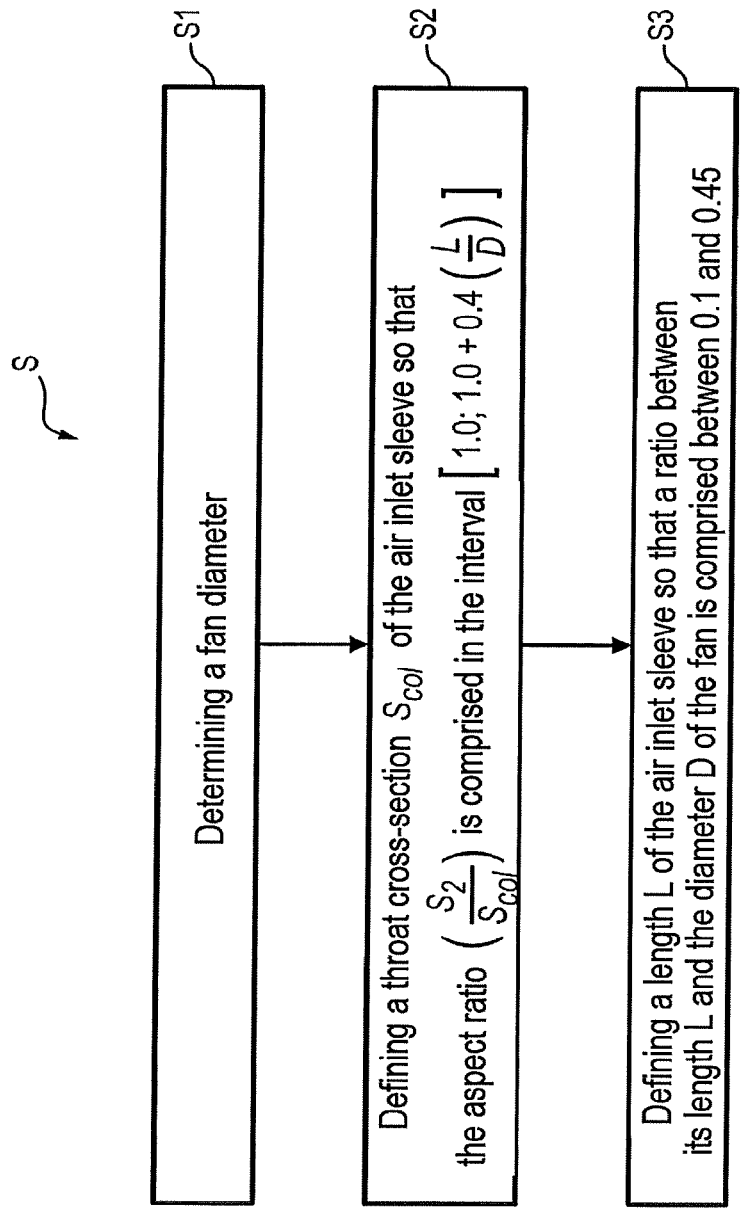
FIG. 2 is a flowchart illustrating the steps of an example of the method of dimensioning a turbojet conforming to the invention.

Hereafter, a turbojet 1 will be described at present with reference to the appended FIG. 1.

The turbojet 1 comprises, conventionally, a fan 2 housed in a fan casing, an annular primary flow space and an annular secondary flow space.

The primary flow space passes through a primary body, which can be conventional. A conventional primary body having been described above with reference to FIG. 3, it will not be further detailed here.

The fan 2 comprises a fan rotor comprising a fan disk 20 centered on an axis of revolution X of the fan and provided with fan blades 22 at its periphery which, when they are placed in rotation, drive the air flow in the primary and secondary flow spaces of the turbojet 1. The fan disk 20 is driven by the low-pressure shaft, which is driven in rotation by the low-pressure turbine 6. Moreover, the fan disk includes a nose dome, which forms the farthest upstream rotating portion of the turbomachine. In a manner known per se, the nose dome favors by its shape the aerodynamic efficiency of the turbomachine.

A fan blade 22 comprises conventionally, a leading edge 24 which faces the air flow F entering the fan 2, a trailing edge 26 opposite to the leading edge 24 and pressure side and suction side walls connecting the leading edge 24 and the trailing edge 26. The blade 22 also comprises a root connected to the fan disk 20 and a rip extending facing the fan casing. The root can be applied and attached to the fan disk 20 or, as a variant, can be formed integrally with it in a single part.

The turbojet 1 also comprises, upstream of the fan 2 (with respect to the gas flow direction in the turbojet 1), an air inlet sleeve 30 configured to delimit a gas flow designed to enter into the turbojet 1. The air inlet sleeve separates the flow of air incident on the turbojet 1 between a first flow, which enters into the turbojet 1, and a second flow, which bypasses said turbojet 1. This separation of the first and the second flow occurs at an upstream end of the air inlet sleeve 30 of which the contour defines a collecting surface 32 of said air inlet sleeve 30. Generally, the collecting surface 32 of an air inlet sleeve 30 forms an angle comprised between 4° and 6° with a plane perpendicular to the axis of the fan.

In one embodiment, in order to improve the propulsive efficiency of the turbojet 1, to reduce its specific fuel consumption as well as the noise emitted by the fan 2, the turbojet 1 can have a high bypass ratio. By high bypass ratio is meant here a bypass ratio greater than 10, for example comprised between 12 and 18.

To this end, the fan 2 can be decoupled from the low-pressure turbine 6, thus allowing independent optimization of their respective rotation speeds. For example, the decoupling can be accomplished using a reduction gear such as a star gear reduction mechanism 10 placed between the upstream end of the low-pressure shaft and the fan 2. The fan 2 is then driven by the low-pressure shaft by means of the reduction mechanism 10 and a supplementary shaft, called the fan shaft 2a, which is attached between the reduction mechanism 10 and the disk 20 of the fan 2.

As a variant, the reduction gear 10 can comprise a planetary gear reduction mechanism.

In one embodiment, the reduction ratio of the reduction mechanism 10 is preferably comprised between 2.5 and 5.

The diameter D of the fan 2 can be comprised between eighty inches (203.2 centimeters) and a hundred ten inches (279.4 centimeters), preferably between eighty inches (203.2 centimeters) and ninety inches (228.6 centimeters). By diameter D of the fan 2 is meant here twice the radial distance between the axis X of revolution of the turbojet 1 and the tip 22a of the fan blades 22.

In order to reduce the drag of this turbojet 1 with a high bypass ratio, reducing the size of the air inlet sleeve 30 can be considered. However, the air inlet sleeve 30 has a diffuser function, in other words it has the purpose of channeling, guiding and slowing the incident flow prior to its entry into the fan 2. Moreover, it is necessary to limit the speed deviations in a given cross-section of the flow so as not to create acoustic sources at the fan.

For this purpose, the aspect ratio $$\left(\frac{S_2}{S_{col}}\right)$$

of the turbojet 1 is comprised in the following interval:

$$\text{aspect ratio} = \frac{S_2}{S_{col}} \in \left[1.0; 1.0 + 0.4\left(\frac{L}{D}\right)\right].$$

where: $S_2$ is the cross-section of the fan, defined as a passage cross-section of the flow taken at a downstream point B defined as an intersection between the leading edge 24 of the blades of the fan 2 and the nose dome. This fan cross-section $S_2$ is therefore also a surface perpendicular to the axis X of the fan 2. The cross-section of the fan $S_2$ is moreover delimited by the radially internal wall 34 of the air inlet sleeve 30.

$S_{col}$ is the neck cross-section, defined as the minimum section of the air inlet sleeve 30 between the collecting surface 32 and the fan 2

D is the diameter of the fan 2

L the length of the air inlet sleeve, which is defined as a distance between an upstream point A defined by an intersection of the collecting surface 32 and the axis X of the fan and the downstream point B.

$$\frac{L}{D}$$

is the form factor of the air inlet sleeve, defined as a ration between the length L of the air inlet sleeve 30 and the diameter D of the fan 2.

The form factor L/D can be comprised between 0.1 and 0.45, preferably between 0.2 and 0.37. With such a form factor and an aspect ratio $$\frac{S_2}{S_{col}}$$

comprised in the interval $$\left[1.0; 1.0 + 0.4\left(\frac{L}{D}\right)\right],$$

the acoustics of the turbojet 1 is then not penalized.

The Applicant has in fact observed that such a configuration of the air inlet sleeve 30 allowed both a reduction of the drag of the nacelle and thus compensating the increase in diameter D of the fan 2 resulting from the high bypass ratio of the turbojet 1, while still limiting the speed deviations in a cross-section of the air inlet sleeve and thus the associated acoustic problems.

For example an air inlet sleeve having a form factor $$\frac{L}{D}$$

equal to 0.32 and an aspect ratio $$\frac{S_2}{S_{col}}$$

equal to 1.08 allows this air inlet sleeve 30 to correctly play its diffuser role while guarding against acoustic problems inherent in the azimuthal speed difference.

It will be noted that, generally, the neck cross-section $S_{col}$, which corresponds to the minimum cross-section of the air inlet sleeve 30 between the collecting surface 32 and the fan 2, is inclined with respect to the axis X of the fan, and not orthogonal to it. The air inlet axis and the axis X of the fan are in fact distinct so as to ensure good feeding of the air inlet when the airplane is operating at an angle of attack.

According to one embodiment, the upstream portion of the air inlet sleeve 30 is not symmetrical with respect to the axis of the fan 2. More precisely, the radially internal wall 34 of the air inlet sleeve 30 is closer to the axis X of the fan 2 at 12 o'clock (that is at the top of the turbojet 1, bottom and top being defined with respect to the position occupied during normal flight by the turbojet 1) than at 6 o'clock (that is at the bottom of the turbojet 1). Likewise, the radially external wall 36 of the air inlet sleeve 30 is closer to the axis X of the fan 2 at 12 o'clock than at 6 o'clock. In this manner, it is possible to reduce the overall bulk of the air inlet sleeve 30 by reducing its maximum diameter (outer diameter of the air inlet sleeve 30) without however reducing its thickness and therefore its resistance to impact and to flow turbulence.

It will be noted that, in this case, although the air inlet sleeve 34 is not symmetrical in its upstream zone, at the collecting surface 32 and the neck cross-section $S_{col}$, the downstream portion of the air inlet sleeve 30 can be axisymmetric overall with respect to the axis X of the fan 2, typically at the cross-section of the fan $S_2$). For example, the connection between the upstream, non-symmetrical portion of the air inlet sleeve 30 and its downstream, symmetrical portion can then extend to a distance comprised between one and five centimeters from the plane situated at the intersection of the radially internal wall 34 of the air inlet sleeve 30 and the furthest upstream point of the leading edge 24 of the fan 2 blades, typically at 3.8 cm from said plane.

The invention also proposes a method of dimensioning a turbojet as described below.

To this end, during a first step S1, the diameter D of the fan 2 is determined.

During a second step S2, the air inlet sleeve 30 can then be defined. To that end, the neck cross-section $S_{col}$ of the air inlet sleeve 30 is determined so that the aspect ratio $$\frac{S_2}{S_{col}}$$

is comprised in the interval $$\left[1.0; 1.0 + 0.4\left(\frac{L}{D}\right)\right].$$

As indicated previously, such a configuration allows ensuring, for a given air inlet sleeve 30, acceptable distortion on the fan cross-section $S_2$ and thus avoiding acoustic penalties.

During an optional step S3, the length L of the air inlet sleeve 30 is determined so that the form factor L/D corresponding to the ratio between its length L and the diameter D of the fan 2 is comprised between 0.1 and 0.45, and preferably between 0.2 and 0.37.

It will be noted that the closer the form factor L/D is to 0.1, the shorter the air inlet sleeve 30 is short and the more the mass of the turbojet 1 is reduced. However, the fan 2 of the turbojet 1 is then slightly noisier than when the form factor L/D is closer to 0.45. However, in this case, the air inlet sleeve 30 is longer and the turbojet 1 is then heavier.

The invention claimed is:

1. A double flow turbojet comprising:
    a fan including a fan rotor comprising a disk centered on an axis of the fan comprising an nose dome, the disk being provided with fan blades on a periphery thereof, said blades having a leading edge, and
    an air inlet sleeve extending upstream of the fan and configured to delimit a gas flow designed to enter into the fan, said air inlet sleeve having a collecting surface, wherein an aspect ratio $$\left(\frac{S_2}{S_{col}}\right)$$

of the turbojet is comprised in the following interval:

$$\text{aspect ratio} = \frac{S_2}{S_{col}} \in \left[1.0;\ 1.0 + 0.4\left(\frac{L}{D}\right)\right],$$

where: $S_2$ is a cross-section of the fan, defined as a passage cross-section of the flow taken at an intersection between the leading edge of the blades of the fan and the nose dome, $S_{col}$ is a neck cross-section, defined as a minimum cross-section of the air inlet sleeve between the collecting surface and the fan, D corresponds to a diameter of the fan, L is a length of the air inlet sleeve, which is defined as a distance between an upstream point defined by an intersection of the collecting surface and the axis of the fan and a downstream point defined by the intersection between the leading edge of one of the blades of the fan and the nose dome, and $$\frac{L}{D}$$

is a form factor of the air inlet sleeve, defined as a ratio between the length of the air inlet sleeve and the diameter of the fan, and
    wherein the form factor is comprised between 0.1 and 0.45.

2. The turbojet according to claim 1, wherein the turbojet has a bypass ratio greater than or equal to 10.

3. The turbojet according to claim 2, wherein the bypass ratio is comprised between 12 and 18.

4. The turbojet according to claim 1, wherein the diameter of the fan is comprised between 203.2 centimeters and 228.6 centimeters.

5. The turbojet according to claim 1, wherein the diameter of the fan is comprised between 203.2 centimeters and 279.4 centimeters.

6. The turbojet according to claim 1, wherein an upstream portion of the air inlet sleeve is not symmetrical.

7. The turbojet according to claim 6, wherein a downstream portion of the air inlet sleeve is axisymmetric, a connection between the non-symmetrical upstream portion of the air inlet sleeve and the downstream axisymmetric portion extending at a distance comprised between one and five centimeters from a plane situated at the intersection between a radially internal wall of the air inlet sleeve and a most upstream point of the leading edge of the fan blades.

8. The turbojet according to claim 1, further comprising:
    a primary flow space and a concentric secondary flow space,
    a turbine, housed in the primary flow space and in fluid communication with the fan, and
    a reduction mechanism, coupling the turbine and the fan, said reduction mechanism comprising a star or planetary gear reduction mechanism having a reduction ratio comprised between 2.5 and 5.

9. The turbojet according to claim 1, wherein the form factor is comprised between 0.2 and 0.37.

10. An aircraft comprising the turbojet according to claim 1.

11. A method for dimensioning an air inlet sleeve of a turbojet according to claim 1, comprising:
    determining the diameter of the fan,
    defining the air inlet sleeve so that the aspect ratio $$\left(\frac{S_2}{S_{col}}\right)$$

of the turbojet is comprised in the following interval:

$$\text{aspect ratio} = \frac{S_2}{S_{col}} \in \left[1.0;\ 1.0 + 0.4\left(\frac{L}{D}\right)\right],$$

where: $S_2$ is the cross-section of the fan, defined as a passage cross-section of the flow taken at the intersection between the leading edge of the blades of the fan and the nose dome, $S_{col}$ is the neck cross-section, defined as the minimum cross-section of the air inlet sleeve between the collecting surface and the fan, D corresponds to the diameter of the fan, L is the length of the air inlet sleeve, which is defined as the distance between the upstream point defined by the intersection of the collecting surface and the axis of the fan and a downstream point defined by the intersection between the leading edge of one of the blades of the fan and the nose dome, and $$\frac{L}{D}$$

is the form factor of the air inlet sleeve, defined as the ratio between the length of the air inlet sleeve and the diameter of the fan, and
    defining the form factor so that said form factor is comprised between 0.1 and 0.45.

12. The method of dimensioning according to claim 11, wherein the form factor is comprised between 0.2 and 0.37.

* * * * *